United States Patent [19]

Cameron et al.

[11] 4,128,002

[45] Dec. 5, 1978

[54] METER PROVING APPARATUS

[75] Inventors: Ian F. Cameron, Newark; Michael Layhe, Worksop, both of England

[73] Assignee: Automatic Oil Tools Limited, Hounslow, England

[21] Appl. No.: 790,576

[22] Filed: Apr. 25, 1977

Related U.S. Application Data

[63] Continuation of Ser. No. 608,888, Aug. 29, 1975, abandoned.

[30] Foreign Application Priority Data

Jun. 16, 1975 [GB] United Kingdom ............... 25607/75

[51] Int. Cl.² ............................................. G01F 25/00
[52] U.S. Cl. ......................................................... 73/3
[58] Field of Search ........................... 73/3; 15/104.06; 137/268, 625.43, 625.42

[56] References Cited

U.S. PATENT DOCUMENTS

| | | | |
|---|---|---|---|
| 3,254,523 | 6/1966 | Fisher et al. | 73/3 |
| 3,273,375 | 9/1966 | Howe | 73/3 |
| 3,295,357 | 1/1967 | Halpine et al. | 73/3 |
| 3,421,360 | 1/1969 | Luse et al. | 73/3 |
| 3,423,988 | 1/1969 | Grove et al. | 73/3 |
| 3,668,923 | 6/1972 | Grove et al. | 73/3 |
| 3,768,510 | 10/1973 | Reves | 73/3 X |
| 3,958,444 | 5/1976 | Baker | 73/3 |

FOREIGN PATENT DOCUMENTS 508828 7/1939 United Kingdom ........................ 73/3

*Primary Examiner*—Daniel M. Yasich
*Attorney, Agent, or Firm*—Graybeal, Barnard & Uhlir

[57] ABSTRACT

The specification relates to a meter proving apparatus which has a calibration conduit containing a spherical plug for passing along the conduit with fluid flow and two plug detector devices spaced apart along the conduit for signalling the passing of the plug. The conduit has enlarged end stations in which the plug is located prior to a test operation and there being valve controlled by-passes for the end stations so that fluid flow can be established through the calibration conduit around the end station containing the spherical plug prior to a test operation.

8 Claims, 4 Drawing Figures

METER PROVING APPARATUS

This is a continuation of application Ser. No. 608,888, filed Aug. 29, 1975, now abandoned.

BACKGROUND OF THE INVENTION

1. Field of the Invention

The invention relates to meter proving apparatus for use in test flow meters incorporated in a pipe line for indicating fluid flow rates.

2. Description of the Prior Art

U.K. patent specification No. 865,882 discloses an apparatus for calibrating a meter in a pipe line including a calibration pipe which is fluidly connected into a main pipe line and switches adjacent to each end of and projecting into the calibration pipe and operable by a plug located in the pipe which passes along the pipe with fluid flow. Three-way valves are provided for establishing fluid flow from the pipe line along the calibration pipe in either direction. In order to ensure that the flow in the calibration pipe is fully established before the plug reaches the first of the two switches, it is necessary to provide a considerable length of calibration pipe and whilst this may be satisfactory for a land based system where space is not at premium, it is not acceptable for use on off-shore oil extraction platforms where the space available for such equipment is strictly limited. The object of the present invention is therefore to provide a meter proving apparatus in which fluid flow can be established through the calibration pipe prior to a test operation whilst minimising the length of the calibration pipe.

SUMMARY OF THE INVENTION

The invention provides a meter proving apparatus comprising a calibration conduit for receiving a fluid, a plug located in the conduit to be carried along the conduit by fluid flow along the conduit, two stations at the ends of the conduit for accommodating the plug prior to a test operation, two plug detector devices spaced apart along the conduit between the end stations to signal the passing of the plug for use in computing the fluid flow rate along the conduit and valve controlled connecting means for connecting one end station to a pipe line including a meter to be proved to receive fluid from the pipe line and connecting the other end stations to the pipe line to return the fluid to the pipe line and vice versa, said valve controlled connecting means including a by-pass for at least a part of each end station in which the plug may be located so that the plug may be by-passed before a test operation is started whilst fluid flow to the conduit is established.

DESCRIPTION OF THE PREFERRED EMBODIMENTS

Figure 1:
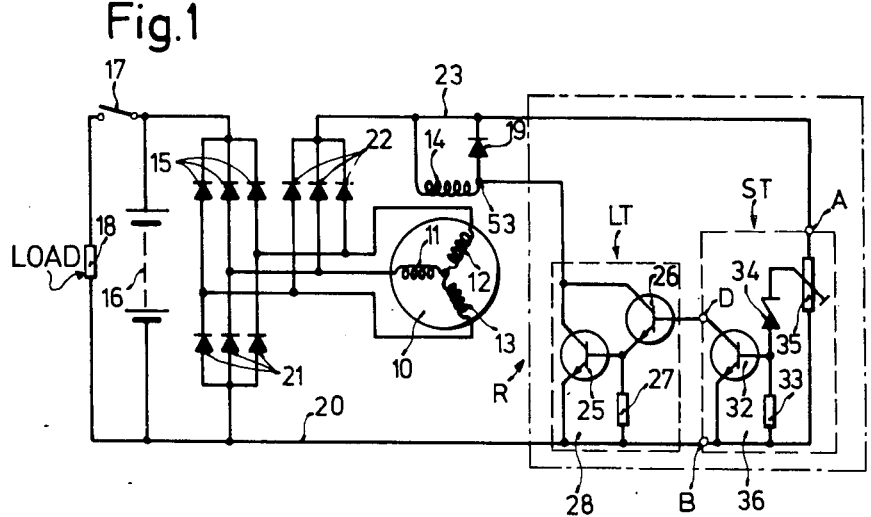
FIG. 1 is diagrammatic view of one form of meter prover apparatus.
Figure 2:
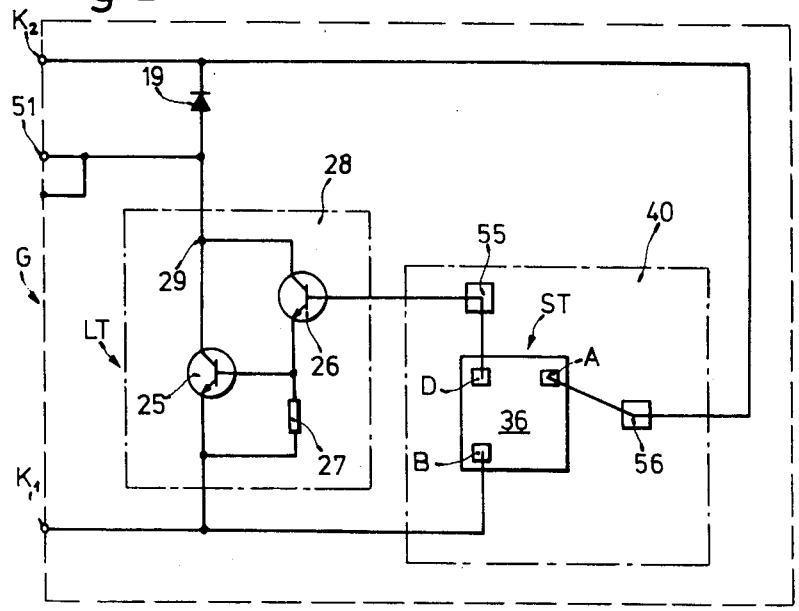
FIG. 2 is a more detailed plan view of the apparatus of FIG. 1.
Figure 3:
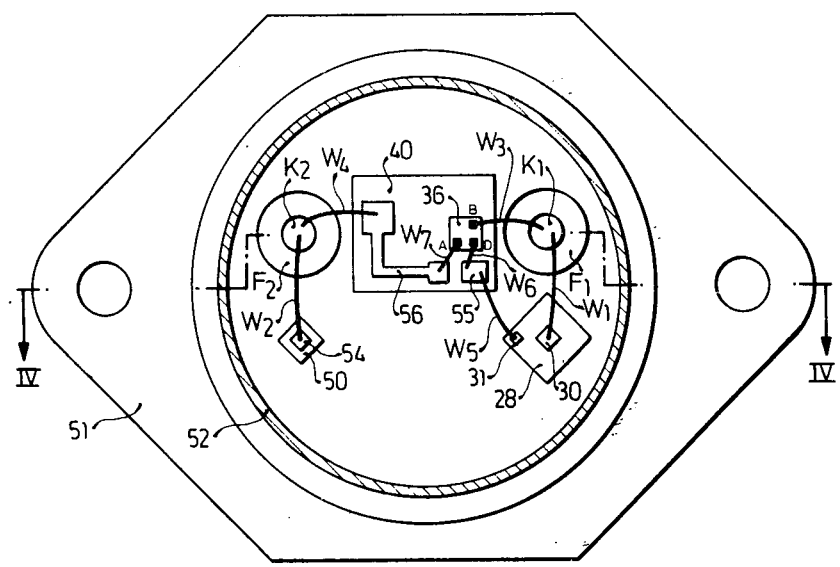
FIG. 3 is a side elevation of the apparatus of FIG. 1.

Referring first to FIGS. 1 to 3 of the drawings, there is shown a meter proving apparatus for use in calibrating an in-flow, volume flow rate meter in a pipe line, for example, for oil or liquified petroleum gas. Conventionally, a number of flow meters are connected in parallel conduits extending between inlet and outlet headers connected in the pipe line. For example, four such conduits each containing a flow meter may be provided for indicating the flow in the pipe line. Isolating valves are provided in the conduit on either side of each flow meter. Each of the conduits may have a branch conduit extending to a prover header through a valve control and the prover header is connected to the prover apparatus as described below through a valve mechanism and the prover apparatus is in turn connected to the aforesaid outlet header for returning the flow to the pipe line.

Referring now to FIG. 1 of the drawings, the conduit extending from the prover header is indicated at 10 and is connected to a flow reversal valve indicated at 11 having one outlet conduit 12 for returning the fluid flow to the aforesaid outlet header and two outlet conduits 13, 14 which are connected to a U-shaped calibration conduit 15. The U-shaped calibration conduit 15 has enlarged diameter end chambers 16, 17 respectively and conduits 13, 14 are connected to the ends of the chambers 16, 17 respectively via diverter valves as described below. A sphere 18 is shown located in one of the end chambers 16. When fluid flow is established through the conduit 15, the sphere 18 is carried by the fluid around the calibration conduit, the sphere being an interference fit in the main part of the calibration conduit 15 between the end chambers 16, 17 to prevent any significant loss of fluid past the sphere as it is carried around the calibration conduit.

Two sphere detection devices 19, 20 are provided at spaced locations around the conduit 15 adjacent the end chambers which are actuated when the sphere passes and provided electrical signals used in a measuring apparatus for determining the actual flow measurement of liquid through the calibration conduit 15 for comparison with the indicated flow measurement on the meter being tested in a known manner.

The conduits 13, 14 connected to the end chambers 16, 17 have diverter valves 21, 22 therein for diverting flow into by-pass conduits 23, 24 which are connected to the end chambers 16, 17 adjacent the main part of the calibration conduit 15. Thus if the sphere 18 is located generally at the centre of the end chamber 16 as indicated in the Figure, the diverter valve 21 can be arranged to divert flow through the by-pass 23 and into the end chamber 16, adjacent the main part of the calibration conduit 15 to by-pass the sphere so that the sphere is not carried into the main part of the calibration conduit. This enables the flow of fluid to be established around the calibration conduit before the sphere is introduced into the main part of the calibration conduit to carry out a meter proving operation. When the flow has been fully established, the diverter valve 21 can simply be switched over to direct the fluid directly into the end of the end chamber 16 and the flow then carries the sphere 18 into the main part of the calibration conduit to perform a calibration operation. The diverter valve 22 at the downstream end of the calibration conduit is set to receive fluid through the by-pass 24 so that the fluid flowing around the calibration conduit 15 is diverted from the end chamber 17 to the by-pass 24. This leaves a column of fluid trapped in the end chamber 17 by the valve 22 which cushions the entry of the sphere 18 to the end chamber at the end of the proving operation, preventing the sphere from colliding with any significant impact against the ends of the end chamber 17. The fluid passing through the by-pass 24 and the valve 22 is directed by the valve 11 into the return conduit 12 to the main outlet header.

At the completion of a meter proving run in one direction, the valve 11 and valves 21 and 22 can simply be switched over to reverse the direction of flow through the calibration conduit 15 to perform a meter proving operation in the opposite direction.

The valves 21 and 22 can be conveniently connected to a single motor driven mechanism for adjusting the valves.

Figure 4:
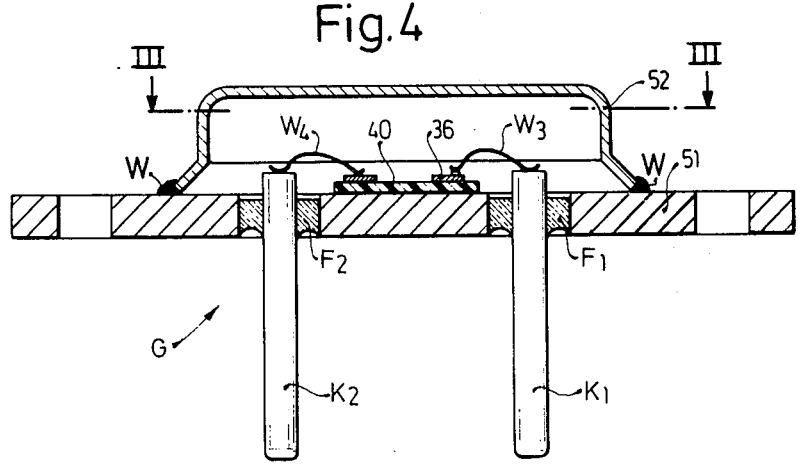
FIG. 4 is a diagrammatic view of a further meter proving apparatus.

Referring now to the embodiment shown in FIG. 4 of the drawings, like parts have been alloted the same reference numerals. The main differences are that the valve 11 is replaced by a three-way valve 28 which has outlets to the conduits 13, 14 and the by-passes in the conduits 23 and 24 are omitted. Instead each end chamber 16, 17 has a separate conduit connection 25, 26 respectively, connected to the end chambers 16 and 17 adjacent the main part of the calibration conduit 15. The conduit 25, 26 extend to a three-way valve 27 the outlet of which is connected to the conduit 12 leading to the main outlet header of the apparatus. If fluid flow is established in the direction shown by setting the valve 28 to deliver fluid into the conduit 13, the valve 27 can be set to connected conduit 25 of the chamber to exit the fluid into the conduit 12 to return to the outlet header. The fluid flow will carry the sphere 18 to the forward position of the end chamber as shown in dotted lines just beyond the conduit 25 but not into the main part of the calibration conduit so that the end part of the end chamber is in effect by-passed and the fluid flow allowed to be established before the sphere 18 is directed into the main part of the calibration conduit. When the fluid flow has been appropriately established, the valve 27 is switched over to connect the conduit 26 of the other end chamber 17 to the outlet conduit 12 and the fluid flow is then established around the calibration conduit 15, the fluid exiting from the chamber 17 through conduit 26, valve 27 and outlet conduit 12 to return to the outlet header. A column of fluid is held in the end chamber 17 by the valve 28 and this cushions the entry of the sphere into the end chamber to prevent the sphere colliding with the end of the chamber as before. Again, as before, the valves 28 and 27 can be appropriately switched over to direct fluid in the opposite direction around the calibration circuit for subsequent meter proving operations.

We claim:

1. A proving apparatus for a flow meter comprising a calibration conduit for receiving a fluid, a plug locatable in the conduit to be carried along the conduit by fluid flow, two end stations at the ends of the conduit for accommodating the plug prior to a test operation, two plug detector devices spaced apart along the conduit between the ends of the stations to signal the passing of the plug along the conduit, a second conduit connected to one of the end stations, a first diverter valve in said second conduit, a third conduit extending from the first diverter valve to the said one end station at a location between the connections of the second concuit and of the calibration conduit with said one end station to provide a by-pass for a part of said one end station, a fourth conduit connected to the other end station, a second diverter valve located in the fourth conduit, a fifth conduit extending from the second diverter valve to said other end station between the connections of the fourth conduit and of the calibration conduit with said other end station to provide a by-pass for a part of said other end station and a further valve for connecting supply and return conduits to the second and fourth conduits to establish a fluid flow in either direction through the calibration conduit, the by-passes for the end stations permitting a stabilized flow rate to be established in the calibration conduit, with said plug being located in the by-passed part of one of said end stations, prior to a test operation so that during a test, the fluid flow rate moving said plug through said conduit is substantially constant.

2. A meter proving apparatus as claimed in claim 1, wherein the calibration conduit has a U formation.

3. A meter proving apparatus as claimed in claim 1, wherein the plug comprises a sphere.

4. A meter proving apparatus as claimed in claim 1, wherein the end stations comprise enlarged conduit portions of the ends of the calibration conduit.

5. A proving apparatus for a flow meter comprising a calibration conduit for receiving a fluid, a plug locatable in the conduit to be carried along the conduit by fluid flow, two end stations connected at the ends of the conduit for accommodating the plug prior to a test operation, two plug detector devices spaced apart along the conduit between the ends of the stations to signal the passing of the plug along the conduit, a first diverter valve having an inlet connected to a supply conduit and having two alternatively selectable outputs, two first conduits extending from the outputs of the first diverter valve to the two end stations respectively, a second diverter valve having an output connected to a return flow conduit and two alternately selectable inputs, two further conduits connected between the end stations and said inputs of said second diverter valve, the two further conduits being connected to the respective end stations between the respective first conduits and the calibration conduit whereby a stabilized flow rate can be established prior to a test operation so that during a test, the fluid flow rate moving said plug through the calibration conduit is substantially constant and wherein one of the end stations is arranged to stop the plug after a test operation.

6. A meter proving apparatus as claimed in claim 5, wherein the calibration conduit has a U formation.

7. A meter proving apparatus as claimed in claim 5, wherein the plug comprises a sphere.

8. A meter proving apparatus as claimed in claim 5, wherein the end stations comprise enlarged conduit portions at the ends of the calibration conduit.

* * * * *